UNITED STATES PATENT OFFICE.

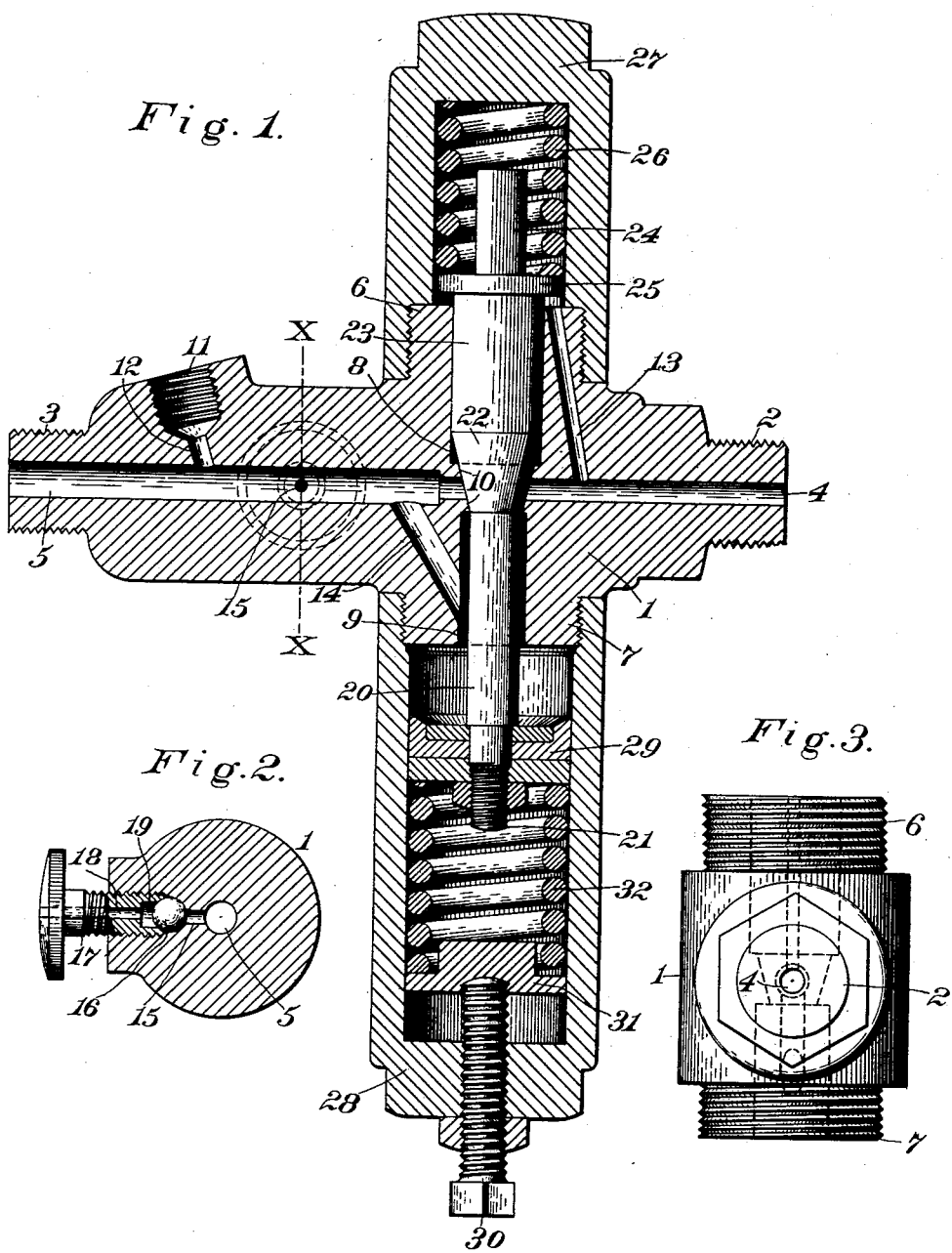

JOHN RIGLING AND JOHN MAYERS, OF PHILADELPHIA, PENNSYLVANIA.

FLUID-PRESSURE REGULATOR.

SPECIFICATION forming part of Letters Patent No. 591,881, dated October 19, 1897.

Application filed March 15, 1897. Serial No. 627,563. (No model.)

*To all whom it may concern:*

Be it known that we, JOHN RIGLING and JOHN MAYERS, citizens of the United States, residing at Philadelphia, in the county of Philadelphia and State of Pennsylvania, have invented certain new and useful Improvements in Fluid-Pressure Regulators; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to fluid-pressure regulators, and has for its object the production of a pressure-reducing valve particularly adapted for use in connection with very high pressures, such as those attained in the storage-tanks employed to serve compressed-air motors, means being provided to maintain the valve within its seat regardless of jars or vibrations.

Another object of our invention may be explained by stating that from the moment of starting the motor and drawing upon the storage-reservoirs the pressure in them falls continually. It is especially desirable, if not essential, that the pressure of fluid delivered to the motor should remain approximately constant, and by our invention this desired condition is promptly reached and accurately maintained.

A still further object of our invention is the construction of an efficient pressure-reducing valve consisting of the fewest number of parts, each part being simplified as far as practicable with the view of economy in manufacturing and durability in actual service.

Each constituent element of our invention is described in detail and its office, together with the mode of operation of the whole, fully explained hereinbelow.

Referring to the accompanying drawings, wherein like letters are used to designate like parts throughout the several views, Figure 1 represents a vertical longitudinal mid-sectional view of our invention; Fig. 2, a vertical cross-section of the invention upon the plane indicated by the line X X in Fig. 1; and Fig. 3, an end view of the main portion or body of the invention, viewed from the right-hand side of its position delineated in Fig. 1.

Considering Fig. 1 numeral 1 marks the body, usually supplied with a right-hand threaded nipple 2 and a similar nipple 3 on the left. Body 1 is bored longitudinally, the bore 4, from the right-hand or high-pressure side, extending beyond the valve-seat and joining the bore 5, of somewhat larger diameter, from the left or low-pressure side. Body 1 possesses an upper threaded nipple 6 and a similar lower nipple 7. The body is also drilled downwardly from nipple 6 and vertically from nipple 7, resulting in the formation of the cylindrical chambers 8 upper and 9 lower, between which is fashioned and ground the valve-seat 10, to the walls of which we customarily give an incline of fifteen degrees from the vertical. Body 1 is also commonly furnished with a threaded tap-hole 11 and duct 12 to low-pressure bore 5, and a suitable gage is connected with the tap-hole. There will be noticed, further, in Fig. 1 a duct 13, leading from high-pressure bore 4 to the top of nipple 6, and a duct 14, leading from low-pressure bore 5 into the lower cylindrical chamber 9, and, considering Fig. 2, one form of relief-valve will be observed. We ordinarily construct the relief-valve by drilling a duct 15 from low-pressure bore 5 to a valve-seat forming a portion of a hollow sphere and accurately adapted to receive a ball-valve 16. Ball-valve 16 is held to its seat by a thumb-screw 17, acting within a suitably-threaded orifice. Screw 17 is bored and counterbored to provide the ducts 18 and 19, by way of which any accidental excess above normal low pressure may be discharged into the atmosphere. As the relief-valve mechanism is of such simple character it is believed that no further description is needed.

Number 20 designates, in Fig. 1, the lower portion of the valve-rod and extends downwardly through lower cylindrical chamber 9 and lower nipple 7, beyond which it terminates in a threaded end 21. The valve proper is marked 22 and corresponds in shape to the seat 10. Above the valve portion the rod is given a cylindrical division 23, which being accurately fitted to the upper cylindrical chamber 8, acts as a guide to direct the valve evenly into its seat. The valve-rod is further extended by an uppermost portion 24, and upon the shoulder formed at the junction of valve-rod portions 23 24 rests a washer 25, upon which is based a spiral spring 26, encircling portion 24 and held in place by the interiorly-threaded thimble or cap 27, shown in engagement with upper nipple 6. Lower nipple 7 engages a thimble 28, interiorly threaded and of the same general character as thimble 27. Within thimble 28 and secured upon end 21 of the valve-rod is a piston 29 of any desired construction and extent, closely fitting the interior of the thimble. Through the lower or closed end of thimble 28 passes a set-screw 30, the upper end of which bears against a shouldered disk 31, that serves as a base for a spiral spring 32, placed between the disk and piston 29. Clearly, any tension may be given spring 32 by means of the set-screw.

Fig. 3 is introduced to show the usual form of the body 1 from the right-hand side, and the broken lines indicate the positions and relative sizes of ducts 13 14.

In explaining the operation of our invention we assume the spiral springs 26 and 32 to have been selected and to be of the proper size and strength for our purpose. An important office of the two springs is to hold the valve-rod against sudden jars, such as are encountered in ordinary railway work. Through duct 13 high pressure reaches the interior of thimble 27 and acts downwardly upon the upper surfaces of the valve-rod. This downward pressure is in a degree relieved by an upward pressure at the meeting plane of bore 4 and valve 22 and farther from the bottom of cylindrical chamber 8, as plainly shown in Fig. 1. To overcome the excess of downward pressure and the tension of spring 26, as well as anything under the normal, predetermined low pressure upon piston 29, is the office of spring 32, governed by set-screw 30 in the well-known manner. From the low-pressure bore 5 the chamber above piston 29 is reached. Let any suitable low pressure be chosen and the adjustment fixed accordingly. Pressure exceeding the predetermined value exerted in the chamber above the piston will draw the valve-rod downward and cut off the high-pressure side. A fall of pressure below the normal above the piston permits it to rise and admit air or other fluid from the high-pressure side. Let it be taken for granted that the downward pressure upon the valve-rod within thimble 27 is exerted upon a certain area, from which deduct the smaller area of contrary or upward pressure. The downward-pressure area is therefore constant, and the downward pressure is greatest with the maximum of high pressure and falls correspondingly as the contents of the reservoirs are consumed. Thus the spiral spring 32 will open the valve to a certain extent against the maximum high pressure and to a greater extent for lower pressures. This is precisely the effect desired, as the less the difference in pressure between high and low sides the greater must the opening movement of the valve be to maintain the low pressure constant.

We are aware that fluid-pressure regulators are constructed and used having the same general structural features as our invention, and we do not claim such valves broadly.

What we do claim, and desire to protect by Letters Patent of the United States, is—

1. In a fluid-pressure regulator, the combination of a body portion having threaded nipples, longitudinal bores, upper and lower cylindrical chambers and a valve-seat, the said body having a duct leading from said bore upon one side of said valve-seat to one of said cylindrical chambers, a valve-rod having a valve portion and a cylindrical guiding portion, said guiding portion adapted to fit one of said cylindrical chambers, said valve-rod having upper and lower rod portions, a thimble engaging one of said nipples and covering one end of said valve-rod, a spiral spring placed between said thimble and rod, a second thimble engaging one of said nipples and covering the remaining end of said valve-rod, a piston secured to said rod and fitting the second thimble interiorly, a spiral spring placed within said second thimble against said piston, and means for adjusting the tension of said spring, substantially as described.

2. In a fluid-pressure regulator, the combination of a body portion having threaded nipples, longitudinal bores, upper and lower cylindrical chambers and a valve-seat, the said body having a duct leading from the top of one of said nipples to said longitudinal bore upon one side of said valve-seat, and a duct leading from said bore to one of said cylindrical chambers upon the other side of said valve-seat, a valve-rod having a valve portion and a cylindrical guiding portion, said guiding portion adapted to fit one of said cylindrical chambers, said valve-rod having upper and lower rod portions, a thimble engaging one of said nipples and covering one end of said valve-rod, a spiral spring placed between said thimble and rod, a second thimble engaging one of said nipples and covering the remaining end of said valve-rod, a piston secured to said rod and fitting the second thimble interiorly, a spiral spring placed within said second thimble against said piston, and means for adjusting the tension of said spring, substantially as described.

3. In a fluid-pressure regulator, the combination of a body portion having threaded nipples, longitudinal bores, upper and lower cylindrical chambers and a valve-seat, the said body having a duct leading from the top of one of said nipples to said longitudinal bore upon one side of said valve-seat, and a duct leading from said bore to one of said cylindrical chambers upon the other side of said valve-seat, a relief-valve, a valve-rod having a valve portion and a cylindrical guiding portion, said guiding portion adapted to fit one of said cylindrical chambers, said valve-rod having upper and lower rod portions, a thimble engaging one of said nipples and covering one end of said valve-rod, a spiral spring placed between said thimble and rod, a second thimble engaging one of said nipples and covering the remaining end of said valve-rod, a piston secured to said rod and fitting the second thimble interiorly, a spiral spring placed within said second thimble against said piston, and means for adjusting the tension of said spring, substantially as described.

In testimony whereof we affix our signatures in presence of two witnesses:

JOHN RIGLING.
JOHN MAYERS.

Witnesses:
SAML. RIGLING,
EDWT. H. MILLER.